United States Patent
Peck et al.

(10) Patent No.: US 11,110,432 B2
(45) Date of Patent: Sep. 7, 2021

(54) MULTI-TRANSITION METAL DOPED COPPER-COBALT SPINEL CATALYST MATERIAL FOR NO$_x$ DECOMPOSITION

(71) Applicant: Toyota Motor Engineering and Manufacturing North America, Inc., Erlanger, KY (US)

(72) Inventors: Torin C. Peck, Ann Arbor, MI (US); Ying Zhang, Ann Arbor, MI (US); Krishna Gunugunuri, Canton, MI (US); Charles A. Roberts, Farmington Hills, MI (US); Chen Ling, Troy, MI (US)

(73) Assignee: Toyota Motor Engineering and Manufacturing North America, Inc., Plano, TX (US)

( * ) Notice: Subject to any disclaimer, the term of this patent is extended or adjusted under 35 U.S.C. 154(b) by 69 days.

(21) Appl. No.: 16/707,083

(22) Filed: Dec. 9, 2019

(65) Prior Publication Data

US 2021/0170365 A1 Jun. 10, 2021

(51) Int. Cl.
*B01J 23/00* (2006.01)
*B01J 23/80* (2006.01)
(Continued)

(52) U.S. Cl.
CPC ............. *B01J 23/005* (2013.01); *B01J 23/80* (2013.01); *B01J 23/8892* (2013.01); *F01N 3/2066* (2013.01)

(58) Field of Classification Search
CPC ............ B01D 53/8628; B01D 53/9413; B01D 2255/405; B01D 2257/402;
(Continued)

(56) References Cited

U.S. PATENT DOCUMENTS 6,033,640 A   3/2000 White
6,153,161 A   11/2000 Fetzer et al.
(Continued)

FOREIGN PATENT DOCUMENTS

EP   210 681 A  *  2/1987  ........... B01D 53/945
JP   08 001 001 A  *  1/1996  ........... B01J 23/005
(Continued)

OTHER PUBLICATIONS

M. Iwamoto et al., "Copper(ii) Ion-exchanged ZSM-5 Zeolites as Highly Active Catalysts for Direct and Continuous Decomposition of Nitrogen Monoxide", J. Chem. Soc. Chem Commun., Jan. 1, 1986, pp. 1272-1273.
M. Haneda et al., "Alkali metal-doped cobalt oxide catalysts for NO decomposition", Applied Catalysis B: Environmental, 2003, vol. 46, pp. 473-482, Elsevier.
(Continued)

*Primary Examiner* — Timothy C Vanoy
(74) *Attorney, Agent, or Firm* — Jordan IP Law, LLC (57) ABSTRACT

Catalysts including multi-transition metal doped copper-cobalt spinel mixed oxide catalyst materials for direct NO$_x$ decomposition with selectivity to N$_2$ from combustion engine exhaust, while minimizing formation of the N$_2$O product. In one example, the catalyst may include a ternary zinc-doped copper-cobalt spinel material or a quaternary manganese+zinc doped copper-cobalt spinel material. The catalysts are effective for reducing NO to N$_2$ at suitable temperatures of 350-500° C., with and without excess O$_2$ presence.

19 Claims, 7 Drawing Sheets

(51) Int. Cl.
    *B01J 23/889* (2006.01)
    *F01N 3/20* (2006.01)
(58) Field of Classification Search
    CPC .............. B01D 2258/012; B01J 23/005; F01N 3/2066; F01N 2370/02; F01N 2570/14
    See application file for complete search history.

(56) References Cited

U.S. PATENT DOCUMENTS

| | | | |
|---|---|---|---|
| 8,419,866 B2 | 4/2013 | Ryu et al. | |
| 9,468,912 B2 | 10/2016 | Nazarpoor et al. | |
| 9,731,279 B2* | 8/2017 | Nazarpoor | B01J 23/005 |
| 10,434,471 B2* | 10/2019 | Peck | B01J 35/0006 |
| 2009/0241514 A1* | 10/2009 | Gernsbeck | B01D 53/326 |
| | | | 60/275 |
| 2016/0263561 A1* | 9/2016 | Nazarpoor | B01J 23/005 |

FOREIGN PATENT DOCUMENTS

| | | | |
|---|---|---|---|
| JP | 2003340279 A | 12/2003 | |
| JP | 2004358458 A | 12/2004 | |

OTHER PUBLICATIONS

P.W. Park et al., "NO decomposition over sodium-promoted cobalt oxide", Catalysis Today, 1998, pp. 51-60, vol. 42, Elsevier.
C. Tofan et al., "Direct decomposition of nitric oxide over perovskite-type catalysts: Part II. Effect of oxygen in the feed on the activity of three selected compositions", Applied Catalyst A: General, 2002, pp. 225-240, vol. 226, Elsevier.
Xuan Lun Pan et al., "Enhancement of nitric oxide decomposition efficiency achieved with lanthanum-based perovskite-type catalyst", Journal of the Air & Waste Management Association, Mar. 2, 2016, pp. 619-630, vol. 66 No. 6, Taylor & Francis.
H. Yu et al., "Pb0.04Co Catalyst for N2O decomposition in presence of impurity gases", Applied Catalyst B: Environmental, 2016, pp. 110-118, vol. 185, Elsevier.
Bjorn Moden, et al., "Catalytic NO Decomposition on Cu-ZSM5: Kinetically Relevant Elementary Steps and Speciation and Role of Cu Structures", NAM Poster, retrieved at http://www.nacatsoc.org/18nam/Posters/P019-Catalytic%20NO%20Decomposition%20on%20Cu-ZSM5.pdf on Dec. 5, 2016, 2 pages.
Yanping Zhang et al., "Hydrothermal Stability of Cerium Modified Cu-ZSM-5 Catalyst for Nitric Oxide Decomposition", Journal of Catalysis, 1996, pp. 131-145, vol. 164.

* cited by examiner

MULTI-TRANSITION METAL DOPED COPPER-COBALT SPINEL CATALYST MATERIAL FOR $NO_x$ DECOMPOSITION

TECHNICAL FIELD

The present disclosure generally relates to multi-transition metal doped copper-cobalt spinel mixed oxide catalyst materials and methods of using said catalyst materials for $NO_x$ decomposition, with or without the presence of oxygen.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

$NO_x$ emissions regulations are becoming increasingly stringent in the 21st century, as they contribute significantly to global pollution and can have a negative impact on human health.

Since automotive emissions are decreasing in temperature due to more fuel-efficient combustion methodology, it is important to reduce $NO_x$ to benign $N_2$ and $O_2$ at a temperature of ≤500° C. As there is a decrease in unburned hydrocarbons and CO emitted with such combustion conditions, there is a need for catalysts to drive $NO_x$ reduction to $N_2$ and $O_2$ which can operate without additional reductants (i.e., decompose $NO_x$ directly to $N_2$ and $O_2$), which would allow for complete utilization of fuel during the combustion process. However, most catalysts are not active for direct $NO_x$ decomposition at such low temperatures (i.e., room temperature to 250° C.). Among the few known catalysts which are active for NO decomposition at low temperature, many side-products form, for example, the incomplete reduction of NO to $N_2O$ (a greenhouse gas with 300× greater global warming potential than CO) and the undesirable oxidation of NO to $NO_2$. Additionally, the direct $NO_x$ decomposition reaction at lower temperatures is very challenging with the presence of $O_2$ in the feed, as the NO oxidation reaction occurs almost exclusively over most catalysts.

Currently, $NO_x$ is reduced via three-way catalysts, which utilize unburned fuel in the form of hydrocarbons and carbon monoxide, to drive the reduction of $NO_x$ to $N_2$ and $O_2$. Most catalysts which are highly active for three-way catalysis are not sufficiently active direct $NO_x$ decomposition catalysts. Ammonia SCR of $NO_x$ is utilized to generate $N_2$ from $NO_x$ in the presence of excess $O_2$, however the engineering to achieve this purification is quite complex and not suitable for all vehicles; furthermore, durability issues and the formation of ammonium nitrate, fouling the catalyst surface, remain technical challenges for Ammonia SCR catalysts. Not carrying an external reductant improves the fuel efficiency of the vehicle and reduces the complexity of manufacturing and owning/operating an automobile. The direct decomposition of $NO_x$ therefore, is a suitable alternative.

SUMMARY

This section provides a general summary of the disclosure and is not a comprehensive disclosure of its full scope or all of its features.

In one aspect, there is disclosed a catalyst for direct $NO_x$ decomposition from an exhaust gas stream which comprises a zinc doped copper-cobalt spinel mixed oxide material. The zinc doped copper-cobalt spinel catalyst material has a formula of $Zn_aCu_bCo_{3-a-b}O_4$, wherein $0.01<a<0.4$, and $0.01<b<1.5$. In one embodiment, $0.01<a≤0.3$. In another embodiment, $0.01<b<1.0$.

In another aspect, there is provided a catalyst for direct $NO_x$ decomposition from an exhaust gas stream which comprises a manganese+zinc doped copper-cobalt spinel material of the formula $Mn_xZn_aCu_bCo_{3-x-a-b}O_4$, wherein $0.01<x<0.3$, $0.01<a<0.4$, and $0.01<b<1.5$. In one embodiment, $0.01≤x≤0.1$. In another embodiment, $0.01<a≤0.3$. In a further embodiment, $0.01<b<1.0$.

In another aspect, there is provided a method for direct $NO_x$ decomposition with selectivity to $N_2$ in excess $O_2$ from combustion engine exhaust, which comprises exposing an exhaust gas having $NO_x$ at a temperature range of from 350 to 500° C. to a catalyst selected from the group consisting of a catalyst comprising a zinc doped copper-cobalt spinel material of formula: $Zn_aCu_bCo_{3-a-b}O_4$, wherein $0.01≤a≤0.4$, and $0.01≤b≤1.5$; and a catalyst comprising a manganese+ zinc doped copper-cobalt spinel material of the formula: $Mn_xZn_aCu_bCo_{3-x-a-b}O_4$, wherein $0.01≤x≤0.3$, $0.01≤a≤0.4$, and $0.01≤b≤1.5$. In one embodiment, the exhaust gas is at a temperature range of from about 400° C. to 500° C. In another embodiment, the exhaust gas is at a temperature of about 400° C. to about 450° C.

Further areas of applicability and various methods of enhancing the above technology will become apparent from the description provided herein. The description and specific examples in this summary are intended for purposes of illustration only and are not intended to limit the scope of the present disclosure.

DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DESCRIPTION

The present disclosure provides for catalysts that directly decompose $NO_x$ from 350-500° C., based on copper-doped cobalt spinel ($Cu_bCo3-bO_4$, wherein $0.01<b<1.5$). The copper-doped cobalt spinel directly decomposes NO to $N_2$, while minimizing formation of $N_2O$ product. Further improvements to the copper-doped cobalt spinel NO decomposition activity can be made through Zn and Mn doping. These catalysts function to reduce NO to $N_2$ at suitable temperatures of 350-500° C., with and without the presence of excess $O_2$.

It is believed that copper-cobalt oxides have the highest surface area normalized activity to $N_2$ of any catalyst previously known. The present inventors have found that doping copper-cobalt with specific concentrations of Zn (0.01-0.4) and Mn (0.01-0.3) as in the present invention, remarkably improves the direct $NO_x$ decomposition performance significantly at reasonable operating temperatures, and in oxygen-containing feeds.

Most catalysts active for direct $NO_x$ decomposition are only efficient at high temperatures (i.e., greater than 500° C.), and also without the presence of $O_2$, which severely limits practical application. Copper-cobalt and doped versions thereof, in comparison to either the bare $Co_3O_4$ spinel oxides, other oxides such as perovskite $ABO_3$ ($LaFeO_3$, for example), PGMs, and zeolites such as Cu-ZSMS, have good activity to desirable $N_2$ without generating as many undesirable side products, such as $N_2O$. Cu-ZSMS zeolite is considered the most widely known lean $NO_x$ decomposition catalyst at <500° C., but the $N_2$ selectivity/activity decreases with an increase in contact time and therefore is less desirable for automotive applications.

Current technology requires the use of unburned hydrocarbons or CO to reduce $NO_x$ to $N_2$ in excess oxygen. This technology presents a method to enhance reduction of $NO_x$ to $N_2$ in excess oxygen, without the requirement of unburned hydrocarbons (for example, propylene) and/or CO. This allows for increased utilization of fuel by allowing complete combustion of hydrocarbons to $CO_2$ and $H_2O$. The current technology does not yield benign $N_2$ during such a process, instead generating undesirable side products such as $N_2O$ or $NO_2$ in such condition.

It is well known, for example, that simple perovskites and PGMs are not sufficiently active for NO decomposition in excess $O_2$. The bare spinel $Co_3O_4$ and the perovskite $LaFeO_3$ produce only $NO_2$ during NO decomposition <500° C. in excess $O_2$, which is also an undesirable product in comparison to $N_2$. The PGMs produce primarily $NO_2$ during low temperature lean $NO_x$ decomposition, however select bimetallic PGMs are known to produce $N_2$ in very small quantities (<20 ppm).

While a plethora of rare-earth oxides have been reported as active for NO decomposition in excess $O_2$, these materials only catalyze the reaction at temperatures in excess of 600° C., which is not useful for practical application.

Some references show that NO decomposition in the presence of $O_2$ does not proceed over perovskites at reduced temperatures. Although some references claim NO decomposition over perovskite-type oxides in excess $O_2$, they do not detect the $N_2$ product directly, but rather indirectly via FTIR and nitrogen mass balance calculations. Due to their operating conditions (relatively low GHSV coupled with a low NO concentration, and lack of time on stream data presented at low temperatures), the catalyst was likely performing $NO_x$ storage. For the copper-cobalt spinels and their doped derivatives of the present invention, mass spectrometry was used for the evaluations in excess $O_2$ to more directly detect the formation of m/z 28 ($N_2$), which is more reliable than FTIR.

Finally, there are no reports of Mn and Zn co-doping to improve the NO decomposition in excess $O_2$ of spinel oxides. Although there are reports of manganese promoted copper-cobalt for the Fisher-Tropsch reaction, the reported catalysts only work with high concentrations, i.e., 0.8 Mn in the $M_3O_4$ spinel, whereas the catalyst of the present invention work with lower amounts of Mn such as, $0.01 \leq Mn \leq 0.3$. Compositions having $Mn>0.3$ display significant Mn enrichment on the surface, decreasing the Co—Cu interface and the catalytic activity.

The activity and selectivity to $N_2$ in excess $O_2$ at temperatures as low as 450° C. can be improved by doping the copper-cobalt system with first row transition metals such as Zn and Mn via co-precipitation method, and improve the NO decomposition activity to $N_2$ at 500° C. by up to 33% by optimizing the Zn and Mn concentrations. Mn was found to reduce CuO crystallinity in copper-cobalt compared to samples without Mn, and also to create more active surface lattice oxygen species, stabilizing $NO_2$ side-product formation necessary to close catalytic cycle. Zn was found to modify the spin state of $Co^{3+}$ in copper-cobalt, presumably creating more high-spin $Co^{3+}$, which more easily reduces to $Co^{2+}$. This improvement is believed to be represented by the high $N_2$ selectivity (i.e., reduced $NO_2$ production), over Zn doped copper-cobalt, which is typically over 70% at 500° C., whereas utilizing certain concentrations of the binary copper-cobalt and manganese doped copper-cobalt can result in $N_2$ selectivity slightly lower, (i.e., 50-75%). Combining the Mn and Zn as dopants of copper-cobalt produced the most active NO decomposition catalyst at 500° C., with over 80% $N_2$ selectivity and a catalytic activity of 0.05 µmol NO converted to $N_2$, per gram catalyst per second. The optimization of the Cu distribution in copper-cobalt, and Mn and Zn contribution toward the physical and electronic characteristics of cobalt yields a highly active $NO_x$ decomposition catalyst.

The multi-transition metal doped copper-cobalt spinel mixed oxide catalysts materials of the present invention may be synthesized by a simple and scalable co-precipitation technique. For example, the required amounts of the metal nitrates may be dissolved separately in water and the resulting solutions mixed together. The precipitating agent such as $NH_4OH$, $NaOH$, $(NH_4)_2Co_3$, and $Na_2Co_3$ may be separately dissolved in water and the resulting precipitating agent solution slowly added to the metal nitrate solution and stirred until the desired pH is reached to drive precipitation of the mixed-metal hydroxides. The supernatant liquid may be decanted and filtered to obtain a precipitate. The precipitate may be dried, ground into a powder, and then calcined. Calcining may be at a temperature from about 500-1000° C. for about 1 to 50 hrs. at a ramp rate of about 1 to 20° C./min.

Catalysts comprising multi-transition metal coped copper-cobalt spinel ($Cu_bCo_{3-b}O_4$, wherein $0.01 \leq b \leq 1.5$) may be doped with Mn, Zn or a combination of Mn+Zn. The spinels may be binary, ternary or quaternary.

In one aspect, the catalysts of the present invention comprise a manganese doped copper-cobalt spinel material having the following formula: $Mn_xCu_bCo_{3-y-b}O_4$, wherein $0.01<x<0.3$, and $0.01<b<1.5$. In one embodiment, $0.01\leq x\leq 0.1$. In another embodiment, $x=0.1$. In another embodiment, $0.01<b<1.0$.

Catalysts comprising manganese doped copper-cobalt spinel materials of the present invention may include, but are not limited to, $Mn_{0.1}Cu_{0.1}Co_{2.8}O_4$, $Mn_{0.1}Cu_{0.2}Co_{2.7}O_4$, $Mn_{0.1}Cu_{0.4}Co_{2.5}O_4$, $Mn_{0.1}Cu_{0.5}Co_{2.4}O_4$, $Mn_{0.1}Cu_{0.6}Co_{2.3}O_4$, $Mn_{0.1}Cu_{0.7}Co_{2.2}O_4$, $Mn_{0.1}Cu_{0.8}Co_{2.1}O_4$, $Mn_{0.2}Cu_{0.1}Co_{2.7}O_4$, $Mn_{0.2}Cu_{0.2}Co_{2.6}O_4$, $Mn_{0.2}Cu_{0.4}Co_{2.4}O_4$, $Mn_{0.2}Cu_{0.5}Co_{2.3}O_4$, $Mn_{0.2}Cu_{0.6}Co_{2.2}O_4$, $Mn_{0.3}Cu_{0.2}Co_{2.5}O_4$, $MnO_3Cu_{0.4}Co_{2.3}O_4$, $Mn_{0.3}Cu_{0.5}Co_{2.2}O_4$, $Mn_{0.3}Cu_{0.6}Co_{2.1}O_4$, and $Mn_{0.3}Cu_{0.7}Co_2O_4$.

In another aspect, the catalysts of the present invention comprise a zinc doped copper-cobalt spinel material having the following formula: $Zn_aCu_bCo_{3-a-b}O_4$, wherein $0.01<a<0.4$, and $0.01<b<1.5$. In one embodiment $0.01<a<0.3$. In another embodiment $0.01<b<1.0$.

Catalysts comprising zinc doped copper-cobalt spinel material of the present invention may include, but are not limited to the following: $Zn_{0.1}Cu_{0.2}Co_{2.7}O_4$, $Zn_{0.1}Cu_{0.4}Co_{2.5}O_4$, $Zn_{0.1}Cu_{0.5}Co_{2.4}O_4$, $Zn_{0.1}Cu_{0.6}Co_{2.3}O_4$, $Zn_{0.1}Cu_{0.7}Co_{2.2}O_4$, $Zn_{0.2}Cu_{0.2}Co_{2.6}O_4$, $Zn_{0.2}Cu_{0.3}Co_{2.5}O_4$, $Zn_{0.2}Cu_{0.4}Co_{2.4}O_4$, $Zn_{0.2}Cu_{0.5}Co_{2.3}O_4$, $Zn_{0.2}Cu_{0.6}Co_{2.2}O_4$, $Zn_{0.3}Cu_{0.3}Co_{2.4}O_4$, $Zn_{0.3}Cu_{0.4}Co_{2.3}O_4$, $Zn_{0.3}Cu_{0.5}Co_{2.2}O_4$, $Zn_{0.3}Cu_{0.6}Co_{2.1}O_4$, and $Zn_{0.3}Cu_{0.7}Co_2O_4$.

In another aspect, the catalysts of the present invention comprise a manganese+zinc doped copper-cobalt spinel material having the following formula: $Mn_xZn_aCu_bCo_{3-x-a-b}O_4$, wherein $0.01<x<0.3$, $0.01<a<0.4$, and $0.01<b<1.5$. In one embodiment, $0.01\leq x\leq 0.1$. In another embodiment, $x=0.1$. In another embodiment, $0.01<a<0.3$. In yet another embodiment, $0.01<b<1.0$.

Catalysts comprising a manganese+zinc doped copper-cobalt spinel material of the present invention include, but are not limited to the following: $Mn_{0.1}Zn_{0.1}Cu_{0.6}Co_{2.2}O_4$, $Mn_{0.1}Zn_{0.2}Cu_{0.6}Co_{2.1}O_4$, $Mn_{0.1}Zn_{0.2}Cu_{0.7}Co_2O_4$, $Mn_{0.1}Zn_{0.2}Cu_{0.1}Co_{2.6}O_4$, $Mn_{0.1}Zn_{0.1}Cu_{0.4}Co_{2.4}O_4$, $Mn_{0.1}Zn_{0.1}Cu_{0.1}Co_{2.7}O_4$, and $Mn_{0.1}Zn_{0.1}Cu_{0.5}Co_{2.3}O_4$.

In another aspect, the present disclosure provides a method for direct $NO_x$ decomposition with selectivity to $N_2$ in excess $O_2$ from combustion engine exhaust, with or without excess $O_2$ presence. The method may comprise exposing an exhaust gas having $NO_x$ at low temperature to a catalyst selected from the group consisting of a catalyst comprising a zinc doped copper-cobalt spinel material having the following formula: $Zn_aCu_bCo_{3-a-b}O_4$, wherein $0.01<a<0.4$, and $0.01<b<1.5$; and a catalyst comprising a manganese+zinc doped copper-cobalt spinel material having the following formula: $Mn_xZn_aCu_bCo_{3-x-a-b}O_4$, wherein $0.01<x<0.3$, $0.01<a<0.4$, and $0.01<b<1.5$. In one embodiment, $0.01\leq x\leq 0.1$. In another embodiment, $x=0.1$. In another embodiment, $0.01<a<0.3$. In yet another embodiment, $0.01<b<1.0$.

In one embodiment, the exhaust gas is at a temperature range of from about a temperature range of from 350 to 500° C. In another embodiment, the exhaust gas temperature range is at a temperature from about 400° C. to 500° C. In another embodiment, the exhaust gas is at a temperature of about 400° C. to about 450° C. In another embodiment, the exhaust gas is at a temperature of about 450° C. or about 500° C.

EXAMPLES

Various aspects of the present disclosure are further illustrated with respect to the following examples. It is to be understood that these examples are provided to illustrate specific embodiments of the present disclosure and should not be construed as limiting the scope of the present disclosure in or to any particular aspect.

Synthesis and Material Characterization

The reagents necessary to synthesize the material were calculated assuming an $M3O4$ structure, with a target yield of 5 g sample. With this composition, the desired stoichiometry of high purity Mn, Co, Cu, and Zn nitrates were dissolved in deionized water. Then, a solution of 7 g NaOH with 100 ml water was made, and slowly added to the mixed nitrate solution to drive a precipitation of mixed-metal hydroxides. The stirring was continued for 30 minutes, then stopped and aged overnight. The resulting precipitates were collected via vacuum filtration and washed with 2,000-2,500 ml deionized water. These precipitates were dried at 120° C. for 12 hours, ground finely via mortar and pestle, and calcined at 500° C. for 1 hour.

Select samples were characterized using powder X-Ray Diffraction (XRD) on a glass slide, with subsequent phase identification using PDXL2 Software.

X-Ray Photoelectron Spectroscopy (XPS) was conducted with an Al source to identify the surface composition and electronics over powdered samples loaded on carbon tape. Typically, the transition metal 2p spectra were obtained, integrated, and published atomic sensitivity factors were utilized to calculate a surface cation composition from the integrated intensity, assuming an $M_3O_4$ structure.

Performance Evaluation

Select samples were evaluated via in situ Raman Spectroscopy, calibrated to +/−2 cm-1 resolution using a silica standard (520.7 cm-1). After obtaining spectra of the as-prepared materials, the samples were pretreated to ~500° C. in 10% $O_2$/He mixture, and held for 45 minutes (spectra taken at 5 and 45 minutes). Additionally, samples were then exposed to 1% NO/He, for three hours' time, obtaining spectra at 5 min, 45 min, 1 hr 45 min, and 3 hrs.

Figure 1:
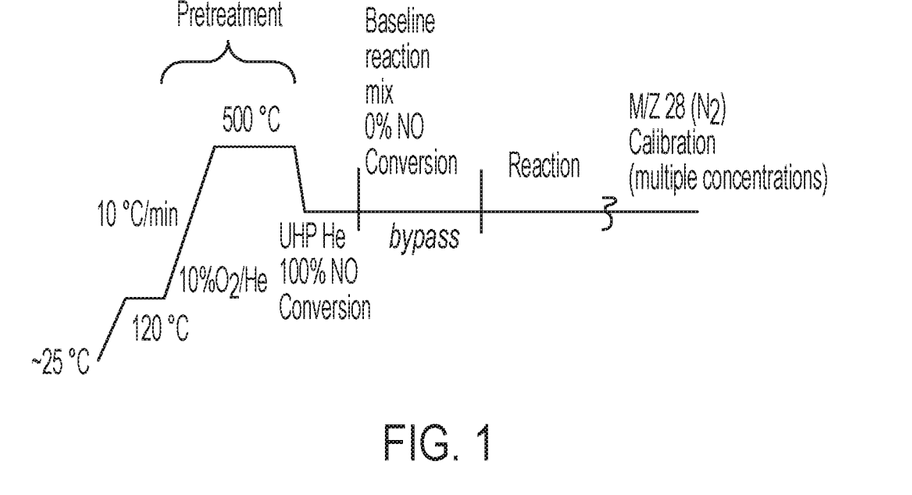
FIG. 1 is an illustration of an example evaluation process for decomposition with excess $O_2$.

The catalytic activity of the materials for NO decomposition was evaluated using a microreactor system (Micromeritics Particulate Systems PID Microactivity Reactor) equipped with a quartz plug flow reactor and coupled with a mass spectrometer (MKS Cirrus-2), for the reaction with excess $O_2$ (see FIG. 1), and with an FTIR provided by CAI analytics for the reaction without excess $O_2$.

For the experiments with additional $O_2$, NO concentration was tracked by the detector signal for m/z=30. To monitor products, the intensities at m/z=28, 16 & 32, 44, and 46 were tracked for $N_2$, $O_2$, $N_2O$ and $NO_2$, respectively. Approximately 450-550 mg of the catalyst was placed between a bed of quartz wool to maintain a 1 cm bed length of catalyst for total gas hourly space velocity (GHSV of ~2,100 h-1). The samples were pretreated to 500° C. at a ramp rate of 10° C./min in 27.8 sccm of 10% $O_2$/He, held for a total of 50 minutes, and cooled to 450 Celsius. To determine the mass spectrometer signal corresponding to 100% conversion of NO, 27.8 sccm of UHP He was flowed over the bypass. Then, a reaction mixture containing approximately 1% $NO_x$/ 1% Ar/He, and 9% $O_2$, was flowed at 27.8 sccm for 30-75 minutes to determine the mass spectrometer signal corresponding to 0% conversion of NO. Next, the flow was stabilized over the catalyst, and the reaction was conducted for at least one hour and in most cases, for at least two hours until the signals of the detector were stabilized. To determine the total $N_2$ production, a calibration gas consisting of $N_2$ in a He balance was utilized to calibrate the m/z=28 response by creating a calibration curve. The calibration curve was utilized to calculate a quantified $N_2$ production.

For the experiments conducted using the FTIR detector, a similar process as to what is outlined above was utilized, however there was no cooling step after pretreatment, instead holding for 60 minutes in UHP He, and the reaction mixture characterized through the bypass for 30 minutes is 1% NO/He, and subsequently is exposed to the catalyst for 3 hours. The activity was recorded and compared after nearly three-hours on stream for all the samples. In this case, $N_2$ was not directly detected, but inferred from a nitrogen mass balance calculation.

Figure 2:
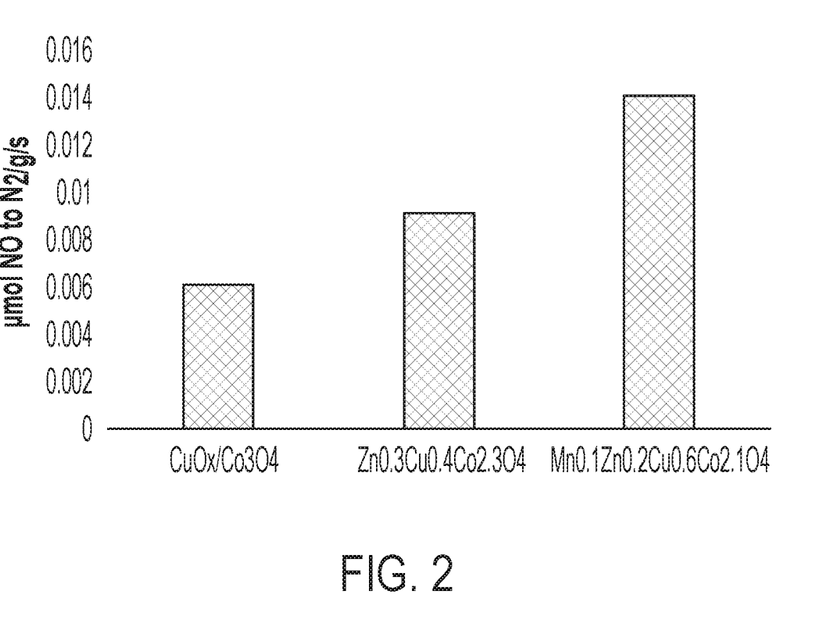
FIG. 2 illustrates the catalytic activity for NO decomposition for copper-cobalt, zinc copper-cobalt, and manganese+zinc copper-cobalt at 450° C. in the presence of 9% $O_2$.

The catalytic activity and $N_2$ selectivity at 500° C. for binary copper-cobalt, ternary manganese doped copper-cobalt, ternary zinc doped copper-cobalt, and manganese+zinc doped copper-cobalt catalysts are provided in Table 1. The sample with the best activity is $Mn_{0.1}Zn_{0.1}Cu_{0.6}Co_{2.2}O_4$, at 0.0498 μmol NO to $N_2$ per gram per second, displaying an $N_2$ selectivity of 80.7%. The catalytic activity for NO decomposition to $N_2$ in 9% $O_2$ at 450° C. over select catalysts is summarized in FIG. 2, with the best-performing catalysts $Zn_{0.3}Cu_{0.4}Co_{2.3}O_4$ and $Mn_{0.1}Zn_{0.2}Cu_{0.6}Co_{2.1}O_4$ outperforming copper-cobalt without other dopants by greater than a factor of two (maximum of 0.014 μmol NO to $N_2$/g/s).

Figure 3:
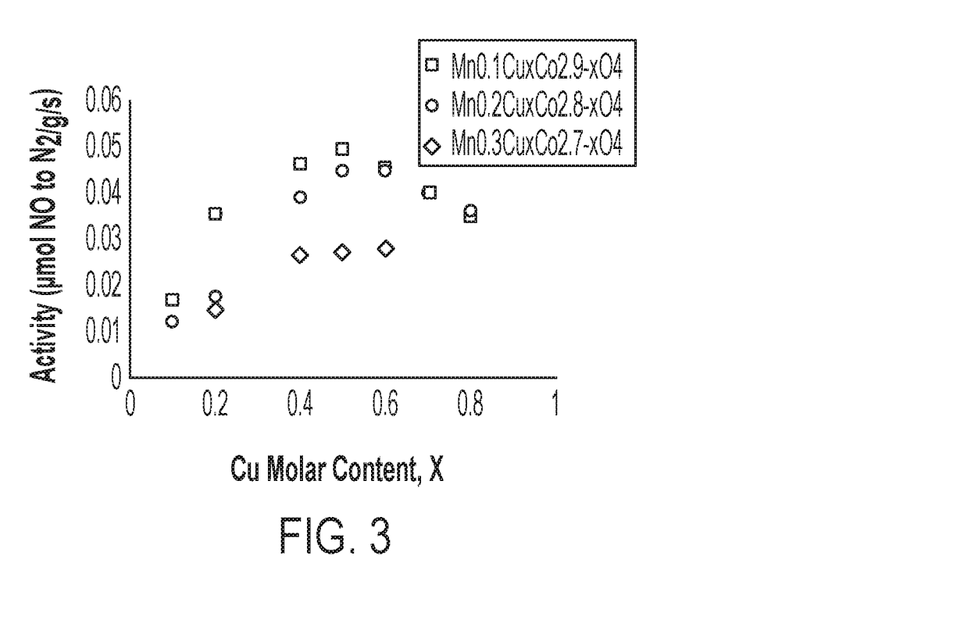
FIG. 3 illustrates NO decomposition activity at 500° C. in 1% NO/He, showing 0.1 and 0.2 Mn as the most effective promoters of copper-cobalt.
Figure 4A:
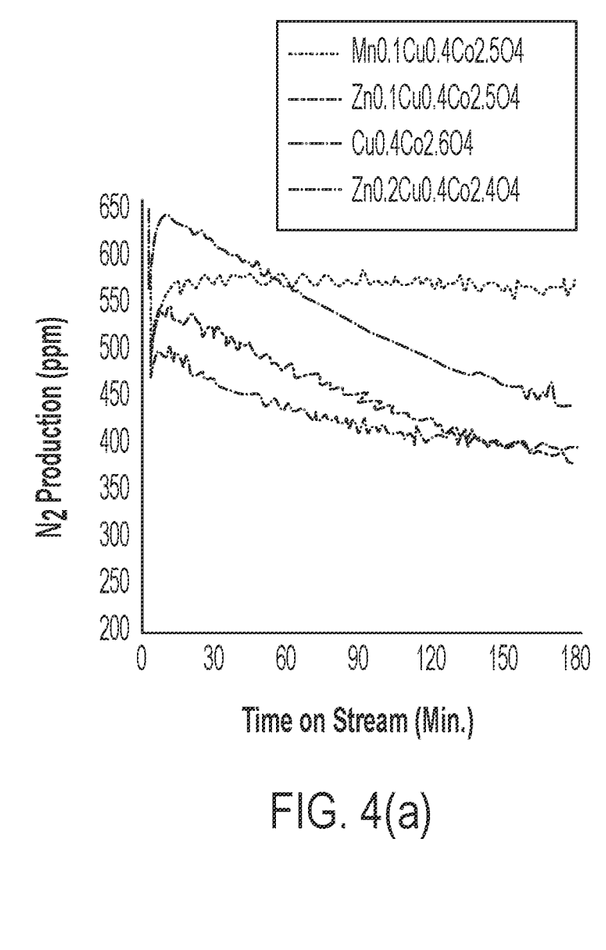
FIGS. 4(a) and 4(b) illustrate Time on Stream during NO decomposition at 500° C., showing initial boost by Zn, and stabilization via Mn (stable $NO_2$) production.
Figure 4B:
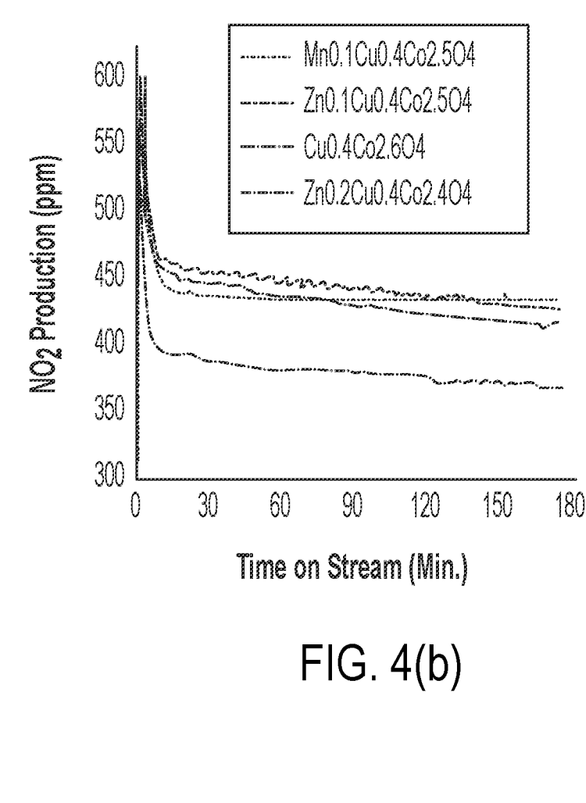
Figure 5:
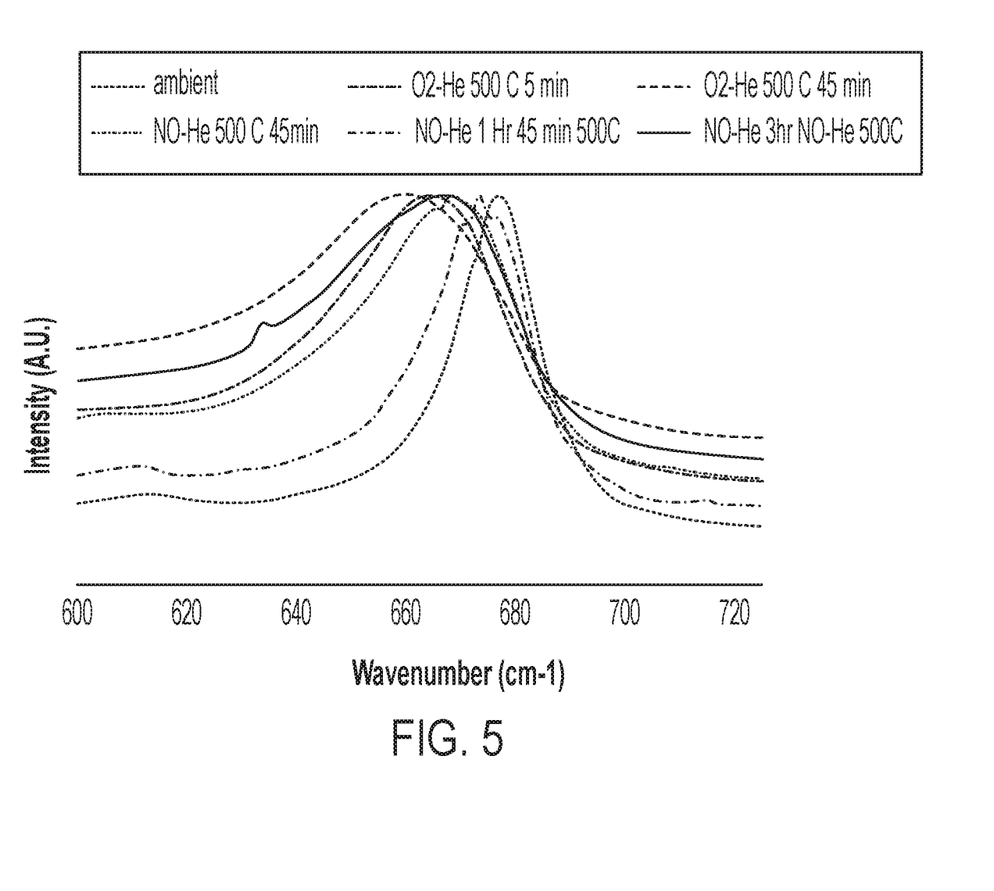
FIG. 5 illustrates In Situ Raman Spectra of $Mn_{0.1}Cu_{0.5}Co_{2.4}O_4$ with varying time, temperature and gas atmosphere.
Figure 6:
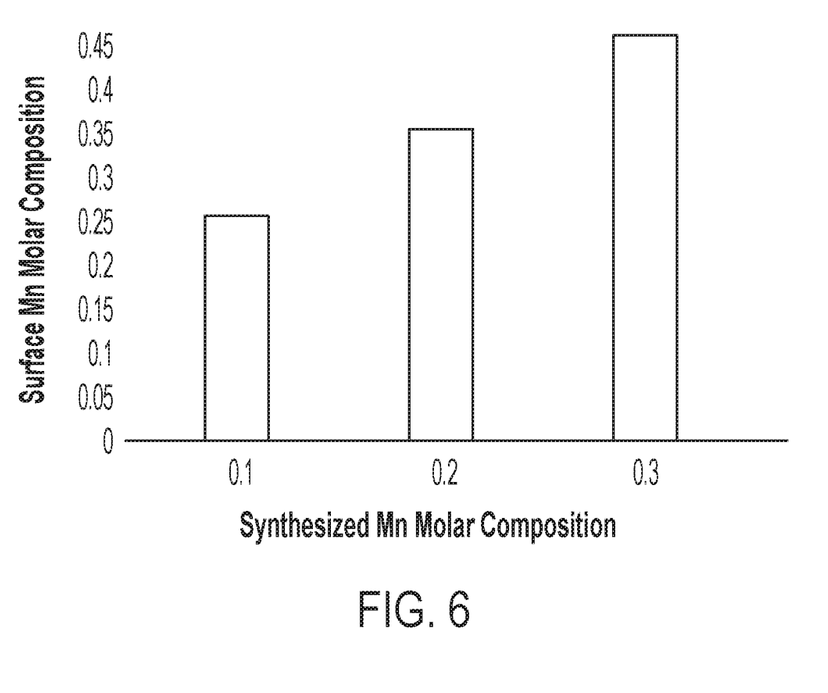
FIG. 6 illustrates XPS profiles of Mn-doped copper cobalt, showing Mn surface enrichment, explaining decreasing activity from 0.3 moles and greater Mn doping.
Figure 7:
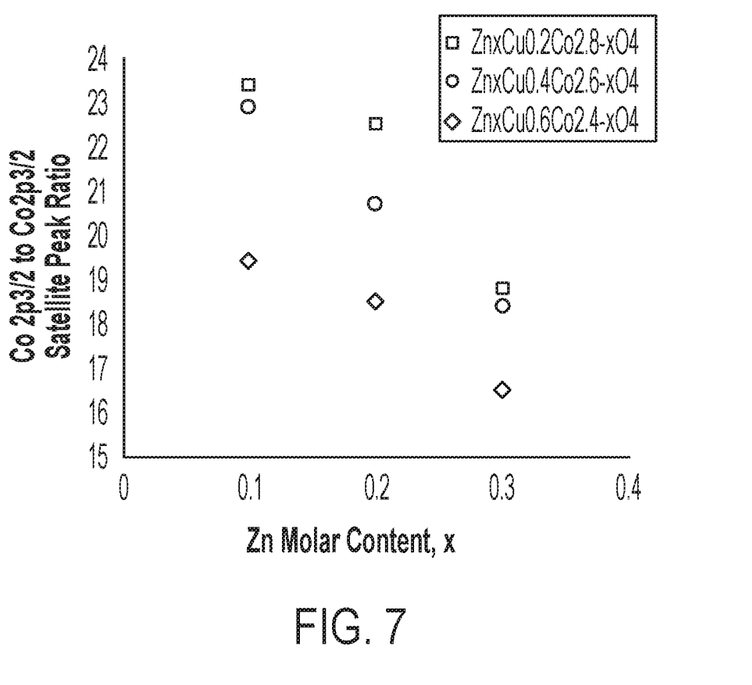
FIG. 7 illustrates Co2p3/2 to Co2p3/2 satellite ratio by XPS, as a function of Zn over various copper-cobalt spinels, demonstrating modified Co3+ spin state with Zn presence.

Mn addition improves the performance of copper-cobalt for NO decomposition at 500° C., however it is optimal at 0.1=Mn, with a slight decrease at higher Mn, although still outperforming undoped copper-cobalt (see FIG. 3). The stabilized $NO_2$ production as a result of Mn addition appears responsible (see FIGS. 4(a) and 4(b)). This could be a result of the formation of Co—O—Mn network with highly labile lattice oxygen, as inferred via in situ Raman Spectroscopy, where it was observed a broadened A1g shifted to lower wavenumber after pretreatment in $O_2$/He (see FIG. 5). Higher Mn, such as Mn=0.3, appear to surface segregate, as seen in XPS analysis, decreasing the available Co—Cu interface for the reaction (see FIG. 6). This explains why there is an optimum Mn content promoting the NO decomposition performance of copper-cobalt. Additionally, Zn was found to modify the Co3+ spin state, likely resulting in more high spin Co3+, which allows release of $O_2$ more easily than low spin Co3+, necessary to complete the catalytic cycle (see FIG. 7). Thus, the most active NO decomposition catalysts in the presence of additional $O_2$ contain Zn.

TABLE 1

NO Decomposition Performance at 500° C. after 3 hrs. on stream

| Catalyst | NO Conversion (%) | $N_2$ Selectivity (%) | Activity (μmol NO to $N_2$/g/s) |
| --- | --- | --- | --- |
| $Cu_{0.1}Co_{2.9}O_4$ | 5.56 | 56.9 | 0.0131 |
| $Cu_{0.2}Co_{2.8}O_4$ | 6.42 | 62.7 | 0.0167 |
| $Cu_{0.3}Co_{2.7}O_4$ | 9.3 | 68.3 | 0.0263 |
| $Cu_{0.4}Co_{2.6}O_4$ | 10.44 | 72.7 | 0.0314 |
| $Cu_{0.5}Co_{2.5}O_4$ | 10.05 | 68.6 | 0.0285 |
| $Cu_{0.7}Co_{2.3}O_4$ | 10.75 | 71 | 0.0316 |
| $Cu_{0.8}Co_{2.2}O_4$ | 9.55 | 69 | 0.0272 |
| $Cu_{0.9}Co_{2.1}O_4$ | 9.46 | 68.7 | 0.0269 |
| $CuCo_2O_4$ | 7.28 | 65.3 | 0.0197 |
| $Mn_{0.1}Cu_{0.1}Co_{2.8}O_4$ | 6.82 | 58.4 | 0.0165 |
| $Mn_{0.1}Cu_{0.2}Co_{2.7}O_4$ | 11.91 | 71.7 | 0.0353 |
| $Mn_{0.1}Cu_{0.4}Co_{2.5}O_4$ | 14.32 | 77.8 | 0.0461 |
| $Mn_{0.1}Cu_{0.5}Co_{2.4}O_4$ | 15.27 | 78.1 | 0.0493 |
| $Mn_{0.1}Cu_{0.6}Co_{2.3}O_4$ | 14.56 | 75.2 | 0.0453 |
| $Mn_{0.1}Cu_{0.7}Co_{2.2}O_4$ | 13.14 | 73.4 | 0.0399 |
| $Mn_{0.1}Cu_{0.8}Co_{2.1}O_4$ | 11.68 | 72.3 | 0.0349 |
| $Mn_{0.2}Cu_{0.1}Co_{2.7}O_4$ | 4.94 | 57.6 | 0.0118 |
| $Mn_{0.2}Cu_{0.2}Co_{2.6}O_4$ | 6.76 | 61.7 | 0.0173 |
| $Mn_{0.2}Cu_{0.4}Co_{2.4}O_4$ | 12.52 | 74.8 | 0.0387 |
| $Mn_{0.2}Cu_{0.5}Co_{2.3}O_4$ | 14.05 | 76.6 | 0.0445 |
| $Mn_{0.2}Cu_{0.6}Co_{2.2}O_4$ | 14.29 | 76 | 0.0449 |
| $Mn_{0.3}Cu_{0.2}Co_{2.5}O_4$ | 6.22 | 57.1 | 0.0147 |
| $Mn_{0.3}Cu_{0.4}Co_{2.3}O_4$ | 8.93 | 71.4 | 0.0264 |
| $Mn_{0.3}Cu_{0.5}Co_{2.2}O_4$ | 9.64 | 67.6 | 0.0269 |
| $Mn_{0.3}Cu_{0.6}Co_{2.1}O_4$ | 9.93 | 67.5 | 0.0277 |
| $Mn_{0.3}Cu_{0.7}Co_2O_4$ | 6.95 | 61.5 | 0.0177 |
| $Zn_{0.1}Cu_{0.2}Co_{2.7}O_4$ | 11.81 | 71.9 | 0.0351 |
| $Zn_{0.1}Cu_{0.4}Co_{2.5}O_4$ | 10.47 | 72.1 | 0.0312 |
| $Zn_{0.1}Cu_{0.5}Co_{2.4}O_4$ | 12.41 | 73.5 | 0.0377 |
| $Zn_{0.1}Cu_{0.6}Co_{2.3}O_4$ | 12.77 | 73.5 | 0.0388 |
| $Zn_{0.1}Cu_{0.7}Co_{2.2}O_4$ | 11.1 | 73.9 | 0.034 |
| $Zn_{0.2}Cu_{0.2}Co_{2.6}O_4$ | 12.22 | 74 | 0.0374 |
| $Zn_{0.2}Cu_{0.3}Co_{2.5}O_4$ | 14.34 | 77.9 | 0.0462 |
| $Zn_{0.2}Cu_{0.4}Co_{2.4}O_4$ | 11.94 | 73.5 | 0.0363 |
| $Zn_{0.2}Cu_{0.5}Co_{2.3}O_4$ | 10.52 | 79.4 | 0.0345 |
| $Zn_{0.2}Cu_{0.6}Co_{2.2}O_4$ | 13.46 | 73.6 | 0.041 |
| $Zn_{0.3}Cu_{0.3}Co_{2.4}O_4$ | 12.52 | 75.4 | 0.0391 |
| $Zn_{0.3}Cu_{0.4}Co_{2.3}O_4$ | 13.35 | 75.6 | 0.0418 |
| $Zn_{0.3}Cu_{0.5}Co_{2.2}O_4$ | 11.22 | 72.6 | 0.0337 |
| $Zn_{0.3}Cu_{0.6}Co_{2.1}O_4$ | 10.99 | 71.8 | 0.0327 |
| $Zn_{0.3}Cu_{0.7}Co_2O_4$ | 11 | 75.8 | 0.0345 |
| $Mn_{0.1}Zn_{0.1}Cu_{0.6}Co_{2.2}O_4$ | 14.9 | 80.7 | 0.0498 |
| $Mn_{0.1}Zn_{0.2}Cu_{0.6}Co_{2.1}O_4$ | 13.02 | 76.2 | 0.041 |
| $Mn_{0.1}Zn_{0.2}Cu_{0.7}Co_2O_4$ | 14.7 | 77.4 | 0.0471 |
| $Mn_{0.1}Zn_{0.2}Cu_{0.1}Co_{2.6}O_4$ | 12.31 | 75.9 | 0.0386 |
| $Mn_{0.1}Zn_{0.1}Cu_{0.4}Co_{2.4}O_4$ | 10.09 | 72 | 0.03 |
| $Mn_{0.1}Zn_{0.1}Cu_{0.1}Co_{2.7}O_4$ | 8.61 | 69.7 | 0.0248 |
| $Mn_{0.1}Zn_{0.1}Cu_{0.5}Co_{2.3}O_4$ | 15.19 | 77.8 | 0.0489 |

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A catalyst for direct $NO_x$ decomposition from an exhaust gas stream, the catalyst comprising a zinc doped copper-cobalt spinel material having the formula: $Zn_aCu_bCo_{3-a-b}O_4$, wherein $0.01 \le a \le 0.4$, and $0.01 \le b \le 1.5$.

2. The catalyst according to claim 1, wherein $0.01 \le a \le 0.3$.

3. The catalyst according to claim 1, wherein $0.01 \le b \le 1.0$.

4. The catalyst according to claim 1, wherein the zinc doped copper-cobalt spinel material is selected from the group consisting of:
   $Zn_{0.1}Cu_{0.2}Co_{2.7}O_4$,
   $Zn_{0.1}Cu_{0.4}Co_{2.5}O_4$,
   $Zn_{0.1}Cu_{0.5}Co_{2.4}O_4$,
   $Zn_{0.1}Cu_{0.6}Co_{2.3}O_4$,
   $Zn_{0.1}Cu_{0.7}Co_{2.2}O_4$,
   $Zn_{0.2}Cu_{0.2}Co_{2.6}O_4$,
   $Zn_{0.2}Cu_{0.3}Co_{2.5}O_4$,
   $Zn_{0.2}Cu_{0.4}Co_{2.4}O_4$,
   $Zn_{0.2}Cu_{0.5}Co_{2.3}O_4$,
   $Zn_{0.2}Cu_{0.6}Co_{2.2}O_4$,
   $Zn_{0.3}Cu_{0.3}Co_{2.4}O_4$,
   $Zn_{0.3}Cu_{0.4}Co_{2.3}O_4$,
   $Zn_{0.3}Cu_{0.5}Co_{2.2}O_4$,
   $Zn_{0.3}Cu_{0.6}Co_{2.1}O_4$, and
   $Zn_{0.3}Cu_{0.7}Co_2O_4$.

5. The catalyst according to claim 1, wherein the zinc doped copper-cobalt spinel material has the formula $Zn_{0.3}Cu_{0.4}Co_{2.3}O_4$.

6. A catalyst for direct $NO_x$ decomposition from an exhaust gas stream, the catalyst comprising a manganese+zinc doped copper-cobalt spinel material having the formula: $Mr_xZn_aCu_bCo_{3-x-a-b}O_4$, wherein $0.01 \le x \le 0.3$, $0.01 \le a \le 0.4$, and $0.01 \le b \le 1.5$.

7. The catalyst according to claim 6, wherein $0.01 \le x \le 0.1$.

8. The catalyst according to claim 6, wherein $x=0.1$.

9. The catalyst according to claim 6, wherein $0.01 \le a \le 0.3$.

10. The catalyst according to claim 6, wherein $0.01 \le b \le 1.0$.

11. The catalyst according to claim 6, wherein the manganese+zinc doped copper-cobalt spinel material is selected from the group consisting of:
    $Mn_{0.1}Zn_{0.1}Cu_{0.6}Co_{2.2}O_4$,
    $Mn_{0.1}Zn_{0.2}Cu_{0.6}Co_{2.1}O_4$,
    $Mn_{0.1}Zn_{0.2}Cu_{0.7}Co_2O_4$,
    $Mn_{0.1}Zn_{0.2}Cu_{0.1}Co_{2.6}O_4$,
    $Mn_{0.1}Zn_{0.1}Cu_{0.4}Co_{2.4}O_4$,
    $Mn_{0.1}Zn_{0.1}Cu_{0.1}Co_{2.7}O_4$, and
    $Mn_{0.1}Zn_{0.1}Cu_{0.5}Co_{2.3}O_4$.

12. The catalyst according to claim 11, wherein the manganese+zinc doped copper-cobalt spinel material is selected from $Mn_{0.1}Zn_{0.1}Cu_{0.6}Co_{2.2}O_4$, and $Mn_{0.1}Zn_{0.2}Cu_{0.6}Co_{2.104}$.

13. A method for direct $NO_x$ decomposition with selectivity to $N_2$ in excess $O_2$ from combustion engine exhaust, said method comprising:
    exposing an exhaust gas having $NO_x$ at a temperature range of from 350 to 500° C. to a catalyst selected from the group consisting of:
    a catalyst comprising a zinc doped copper-cobalt spinel material having the following formula: $Zn_aCu_bCo_{3-a-b}O_4$, wherein $0.01 \le a \le 0.4$, and $0.01 \le b \le 1.5$; and
    a catalyst comprising a manganese+zinc doped copper-cobalt spinel material having the following formula: $Mn_xZn_aCu_bCo_{3-x-a-b}O_4$, wherein $0.01 \le x \le 0.3$, $0.01 \le a \le 0.4$, and $0.01 \le b \le 1.5$.

14. The method according to claim 13, wherein the exhaust gas is at a temperature range of from about 400° C. to 500° C.

15. The method according to claim 13, wherein the exhaust gas is at a temperature of about 400° C. to about 450° C.

16. The method according to claim 13, wherein the zinc-doped copper-cobalt spinel material is selected from the group consisting of:
    $Zn_{0.1}Cu_{0.2}Co_{2.7}O_4$,
    $Zn_{0.1}Cu_{0.4}Co_{2.5}O_4$,
    $Zn_{0.1}Cu_{0.5}Co_{2.4}O_4$,
    $Zn_{0.1}Cu_{0.6}Co_{2.3}O_4$,
    $Zn_{0.1}Cu_{0.7}Co_{2.2}O_4$,
    $Zn_{0.2}Cu_{0.2}Co_{2.6}O_4$,
    $Zn_{0.2}Cu_{0.3}Co_{2.5}O_4$,
    $Zn_{0.2}Cu_{0.4}Co_{2.4}O_4$,
    $Zn_{0.2}Cu_{0.5}Co_{2.3}O_4$,
    $Zn_{0.2}Cu_{0.6}Co_{2.2}O_4$,
    $Zn_{0.3}Cu_{0.3}Co_{2.4}O_4$,
    $Zn_{0.3}Cu_{0.4}Co_{2.3}O_4$,
    $Zn_{0.3}Cu_{0.5}Co_{2.2}O_4$,
    $ZnO_3Cu_{0.6}Co_{2.1}O_4$, and
    $Zn_{0.3}Cu_{0.7}Co_2O_4$.

17. The method according to claim 16, wherein the zinc-doped copper-cobalt material has the formula $Zn_{0.3}Cu_{0.4}Co_{2.3}O_4$.

18. The method according to claim 13, wherein the manganese+zinc doped copper-cobalt spinel material is selected from the group consisting of:
    $Mn_{0.1}Zn_{0.1}Cu_{0.6}Co_{2.2}O_4$,
    $Mn_{0.1}Zn_{0.2}Cu_{0.6}Co_{2.1}O_4$,
    $Mn_{0.1}Zn_{0.2}Cu_{0.7}Co_2O_4$,
    $Mn_{0.1}Zn_{0.2}Cu_{0.1}Co_{2.6}O_4$,
    $Mn_{0.1}Zn_{0.1}Cu_{0.4}Co_{2.4}O_4$,
    $Mn_{0.1}Zn_{0.1}Cu_{0.1}Co_{2.7}O_4$, and
    $Mn_{0.1}Zn_{0.1}Cu_{0.5}Co_{2.3}O_4$.

19. The method according to claim 18, wherein the manganese+zinc doped copper-cobalt spinel material is selected from $Mn_{0.1}Zn_{0.1}Cu_{0.6}Co_{2.2}O_4$, and $Mn_{0.1}Zn_{0.2}Cu_{0.6}Co_{2.1}O_4$.

* * * * *